(12) United States Patent
Kim et al.

(10) Patent No.: US 9,813,984 B2
(45) Date of Patent: Nov. 7, 2017

(54) METHOD OF SAVING POWER OF STATION IN WIRELESS NETWORK (71) Applicant: FCI INC, Seongnam-si, Gyeonggi-do (KR)

(72) Inventors: Beomjin Kim, Seongnam-si (KR); David Cohen, Milpitas, CA (US)

(73) Assignee: FCI INC, Seongnam-si, Gyeonggi-do (KR)

( * ) Notice: Subject to any disclaimer, the term of this patent is extended or adjusted under 35 U.S.C. 154(b) by 76 days.

(21) Appl. No.: 14/846,270

(22) Filed: Sep. 4, 2015

(65) Prior Publication Data

US 2017/0070953 A1   Mar. 9, 2017

(51) Int. Cl.
*G08C 17/00* (2006.01)
*H04W 52/02* (2009.01)
*H04W 12/06* (2009.01)

(52) U.S. Cl.
CPC ....... *H04W 52/0206* (2013.01); *H04W 12/06* (2013.01)

(58) Field of Classification Search
CPC ................ H04W 52/0206; H04W 12/06
USPC ........................................ 370/311
See application file for complete search history.

(56) References Cited

U.S. PATENT DOCUMENTS

| 8,467,348 B2 * | 6/2013 | Jechoux | H04W 48/20 370/310 |
| 9,100,917 B1 * | 8/2015 | Vu | H04W 4/20 |
| 2009/0016296 A1 * | 1/2009 | Jechoux | H04W 48/20 370/331 |
| 2010/0022277 A1 | 1/2010 | An et al. | |
| 2014/0229727 A1 | 8/2014 | Jun | |
| 2014/0281623 A1 * | 9/2014 | Zhang | G06F 1/3209 713/323 |
| 2015/0026491 A1 | 1/2015 | Park et al. | |
| 2015/0215864 A1 * | 7/2015 | Thomas | H04W 52/0216 455/574 |

FOREIGN PATENT DOCUMENTS

| KR | 10-2010-0013922 A | 2/2010 |
| KR | 10-2014-0102070 A | 8/2014 |
| KR | 10-2015-0011737 A | 2/2015 |

* cited by examiner

*Primary Examiner* — Chuong T Ho
(74) *Attorney, Agent, or Firm* — Hauptman Ham, LLP (57) ABSTRACT

A method of saving power of a station in wireless network is provided. The station comprises a connectivity module, a central processing unit, and peripheral devices. The method includes: upon receiving a wake-up signal, powering on the connectivity module, the central processing unit, and the peripheral devices; performing the central processing unit and the peripheral devices in a connection state; performing the connectivity module in an authenticated state; and upon a condition that there is no data to be transferred to the station or after the station transmits and receives all needed data, performing a sleep mode to power off the connectivity module, the central processing unit, and the peripheral devices.

6 Claims, 7 Drawing Sheets

METHOD OF SAVING POWER OF STATION IN WIRELESS NETWORK

BACKGROUND OF THE INVENTION

1. Field of the Invention

The present invention relates to communication, and more specifically to a method for saving power of a station in the wireless network.

2. Description of the Prior Art

Wireless networks are widely deployed to provide various communication services such as video, voice, broadcast, messaging, etc. These wireless networks may be capable of supporting communication for multiple users by sharing the available network resources. Examples of such networks include wireless local area networks (WLANs), wireless metropolitan area networks (WMANs), wireless wide area networks (WWANs), and wireless personal area networks (WPANs).

A wireless network may include any number of access points (APs) and any number of stations. An access point may act as a coordinator for communication with the stations. A station may actively communicate with an access point, may be idle, or may be powered down at any given moment depending on the data requirements of the station.

For a station operating in a power saving mode, when no packet is received or transmitted (hereinafter referred to as a sleep period), components of the station are turned off to reduce current consumption. In order to receive a scheduled packet, components of the station are wakening up before the scheduled packet arrives. For example, during a sleep period, most components, except a GPIO device, of the station are turned off to reduce current consumption.

Because current handheld stations, such as wireless handheld device, are powered by batteries, power saving has always been the primary issue concerned. Proper sleep periods help prolong powered time and battery life.

IEEE 802.11 is a family of standards developed by The Institute of Electrical and Electronics Engineers (IEEE) for WLANs. IEEE 802.11 defines a method for a station to sleep and thus save power. However, the efficiency of the method is limited for stations desiring very low power consumption because of signaling limitations in the standard as well as limited support by the access points and/or stations.

There is therefore a need in the art for techniques to improve the sleep period of a station in a wireless network.

SUMMARY OF THE INVENTION

An object of the present invention is to provide a method of saving power of a station in wireless network by increasing the sleep period of the station.

According to the present invention, a method of saving power of a station in wireless network is provided. The station comprises a connectivity module, a central processing unit (CPU), and peripheral devices. The method comprises: upon receiving a wake-up signal, powering on the connectivity module, the central processing unit, and the peripheral devices; performing the central processing unit and the peripheral devices in a connection state; performing the connectivity module in an authenticated state; and upon a condition that there is no data to be transferred to the station or after the station transmits and receives all needed data, performing a sleep mode to power off the connectivity module, the central processing unit, and the peripheral devices.

In one aspect of the present invention, the station further comprises a general purpose input/output (GPIO) device, and the wake-up signal is sent from the GPIO device in response to an external event.

In another aspect of the present invention, the station further comprises a timer, the method further comprises: upon receiving the wake-up signal, powering on the timer; performing the timer in the connection state; and upon the condition that there is no data to be transferred to the station or after the station transmits and receives all needed data, performing the sleep mode to power off the timer.

In another aspect of the present invention, the method further comprises:
upon a condition that there is data to be transferred by checking delivery traffic indication message (DTIM) from an access point, performing the connectivity module in the authenticated state.

In another aspect of the present invention, the station further comprises a timer, and the wake-up signal is generated when the timer expires by a predetermined time period.

In another aspect of the present invention, the predetermined time period is longer than an interval between two delivery traffic indication messages from the access point.

In another aspect of the present invention, the station further comprises a retention memory for storing information relating to associated states of the central processing unit, and the peripheral devices, and relating to authenticated states of the connectivity module in a previous operation occurred before the last sleep mode. The method further comprises: performing the connectivity module in the authenticated state complying with the previous operation.

In still another aspect of the present invention, the connectivity module comprises a modulator/demodulator, a radio frequency (RF) transceiver, an analog-to-digital converter, a digital-to-analog converter, and a media access controller.

In yet another aspect of the present invention, the connectivity module of the station connects to another station by using WiFi, Bluetooth, Zigbee, and ZWAVE wireless technology standard.

In contrast to prior art, the present invention proposes that a wake up signal is sent from the GPIO device in response to an external event or is periodically generated by the timer. Upon receiving the wake up signal, the battery supplies power to power on the connectivity module, the central processing unit, and the peripheral devices. Since either the interval of the wake up signal sent from the GPIO device in response to the external event or the interval of the wake up signal periodically generated by the timer is a few multiples of the DTIM intervals, the sleep period of the elements in the station 100 according to the present invention is longer than the conventional DTIM intervals. Therefore, the station using the present invention may save more power and thus make the battery life longer.

These and other objectives of the present invention will become apparent to those of ordinary skill in the art after reading the following detailed description of the preferred embodiment that is illustrated in the various figures and drawings.

DETAILED DESCRIPTION OF THE PREFERRED EMBODIMENTS

The power saving techniques described herein may be used for various wireless networks such as WLANs, WMANs, WWANs, WPANs, etc. A WLAN may implement a radio technology such as any defined by IEEE 802.11. A WWAN may be a cellular network such as a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A WMAN may implement a radio technology such as any defined by IEEE 802.16 such as 802.16e, which is commonly referred to as WiMAX, or IEEE 802.20. A WPAN may implement a radio technology such as Bluetooth. For clarity, the techniques are described below for an IEEE 802.11 WLAN.

Figure 1:
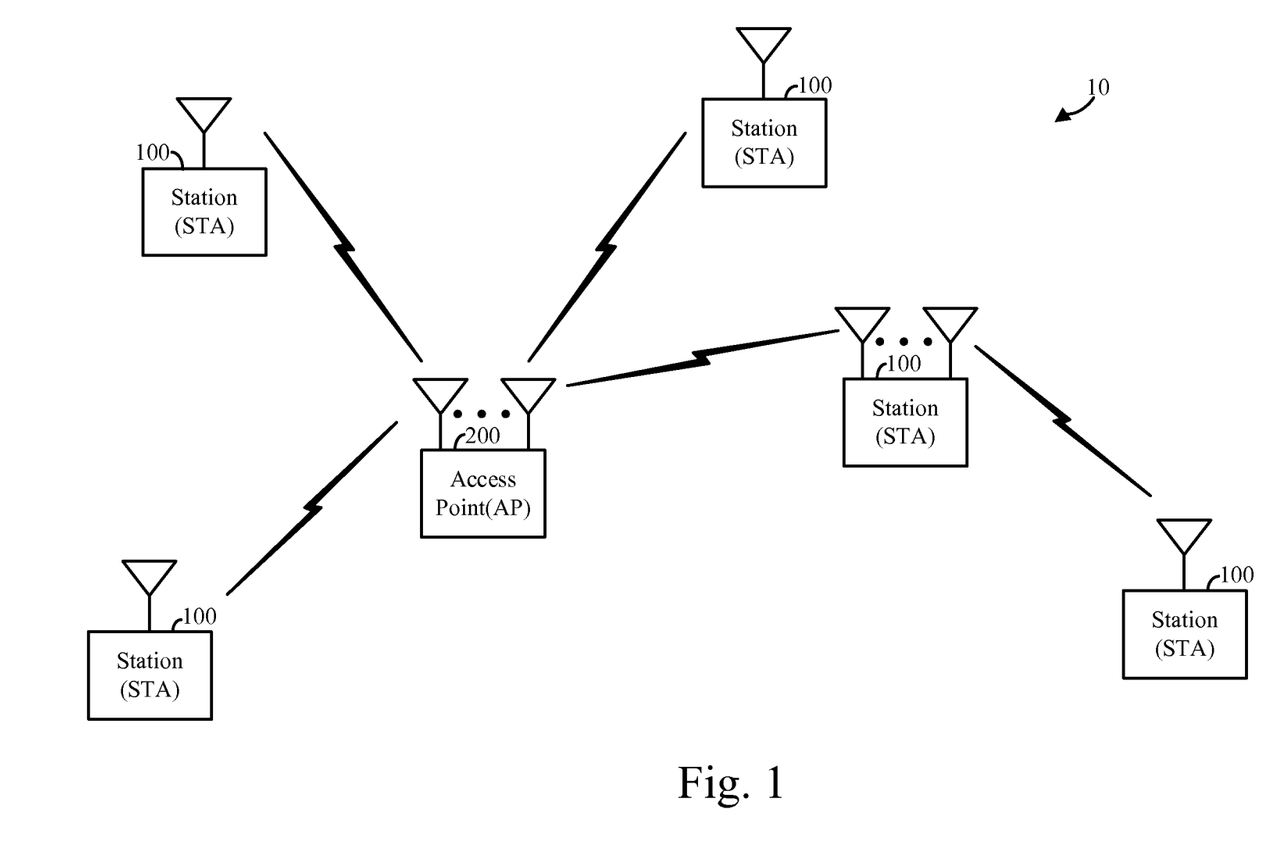
FIG. 1 shows a wireless communication system with an access point and multiple stations according to the present invention.

FIG. 1 shows a wireless communication system 10 with an access point (AP) 200 and multiple stations 100 according to the present invention. In general, a wireless network may include any number of access points and any number of stations. A station is a device that can communicate with another station via a wireless channel. A station may communicate with an access point or peer-to-peer with another station. A station may be a mobile phone, a handheld device, a smart phone, a personal digital assistant (PDA), a laptop computer, and so on. An access point is a station that provides access to distribution services via the wireless channel for stations associated with that access point. A station may communicate with an access point for one or more flows. A flow is a higher layer data stream that is sent via a link. A flow may utilize Transmission Control Protocol (TCP), User Datagram Protocol (UDP), or some other protocol at a transport layer.

The invention can be implemented in a wireless communication system with power saving mechanism, such as wireless local area network power saving specified in the IEEE 802.11 standard. The stations operating in the power saving mode listen to beacon frames periodically broadcast from the access point. If the station is informed by the beacon frame that data packets are buffered at the access point, it will send trigger frame to the access point for the queued data packets.

Figure 2:
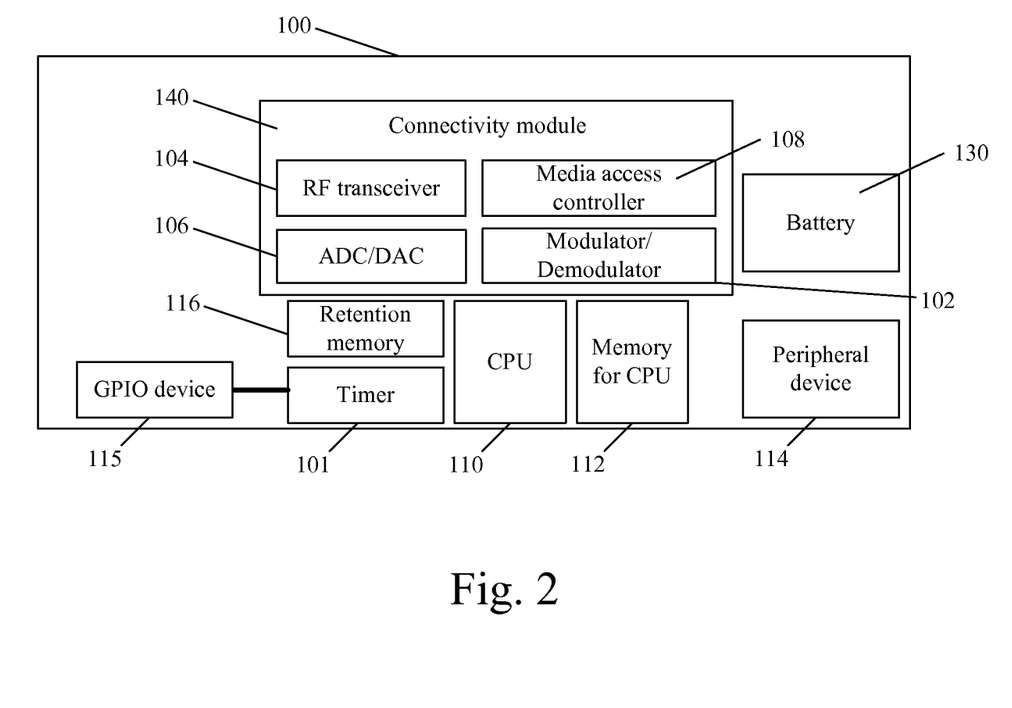
FIG. 2 shows a block diagram of a station according to a preferred embodiment of the present invention.

FIG. 2 shows a block diagram of a station 100 according to a preferred embodiment of the present invention. The station 100 comprises a general purpose input/output (GPIO) device 115, a timer 101, a connectivity module 140, a central processing unit (CPU) 110, a random access memory 112 for the CPU 110, peripheral devices 114, a battery 130, and a retention memory 116. The connectivity module 140 is used for connecting to another station when powering on by using using specific wireless technology standards, such as WiFi, Bluetooth, Zigbee, and ZWAVE. The connectivity module 140 comprises a modulator/demodulator 102, a radio frequency (RF) transceiver 104, an analog-to-digital converter/digital-to-analog converter 106, and a media access controller 108. The peripheral devices 114 can be a Universal Serial Bus (USB) device, a screen, a keyboard, or a speaker.

For improving power efficiency, during the period where there is no data transmission to or from the station 100, the station 100 will shut down almost every components and switch to the sleep mode. In the present invention, at least one of the components of the GPIO device 115, the timer 101, or the retention memory 116 remain awaken when the station 100 is operating in the sleep mode. In the sleep mode, the duration between two awakenings is referred to as a sleep period. In this embodiment of the present invention, the GPIO device 115 remains enabled. The timer 101 and the retention memory 116 are optionally enabled during the sleep period in another embodiments.

Figure 3:
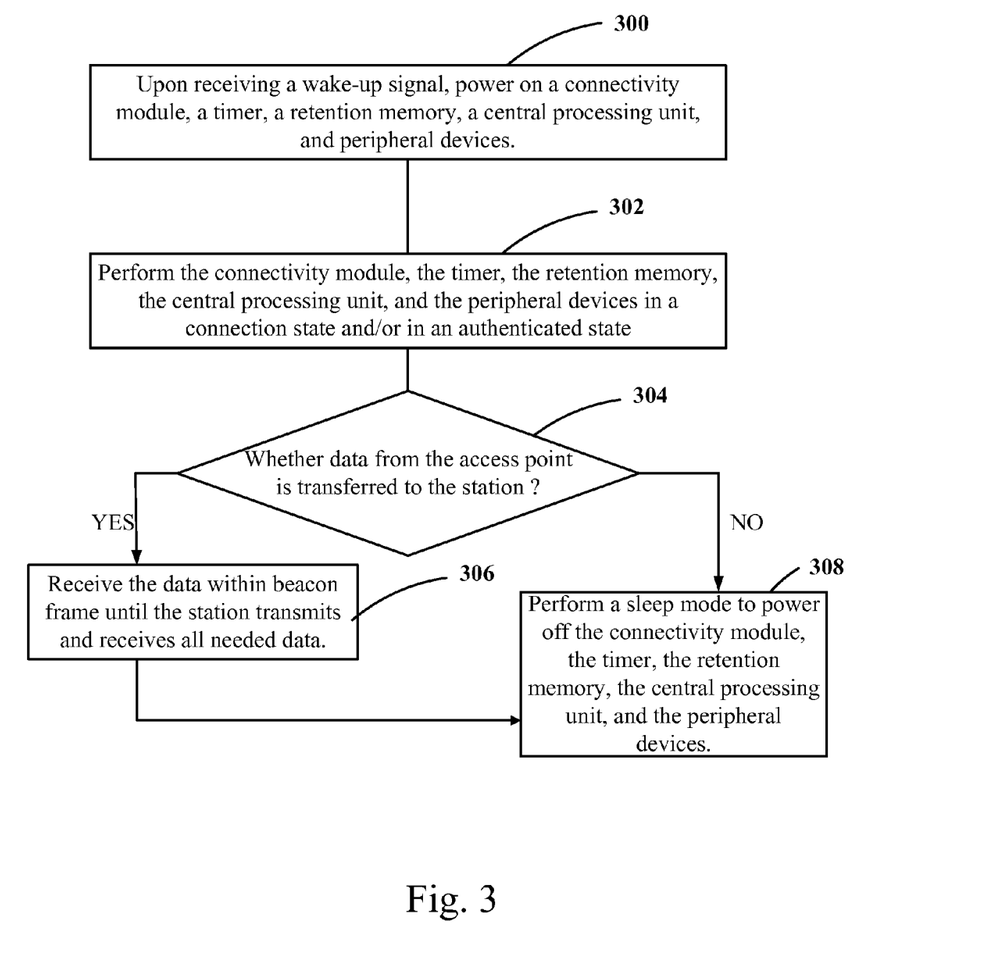
FIG. 3 is a flowchart of a method of saving power of a station in a wireless network according to a first embodiment of the present invention.

Please refer to FIG. 3 in conjunction to FIG. 2. FIG. 3 is a flowchart of a method of saving power of a station in a wireless network according to a first embodiment of the present invention. The method comprises:

Step 300: Upon receiving a wake-up signal, power on the connectivity module 140, the timer 101, the retention memory 116, the central processing unit 110, and the peripheral devices 114.

Step 302: Perform the connectivity module 140, the timer 101, the retention memory 116, the central processing unit 110, and the peripheral devices 114 in a connection state and/or in an authenticated state.

Step 304: Check whether data from the access point 200 is transferred to the station 100.

Step 306: Receive the data along with the beacon frames until the station 100 transmits and receives all needed data.

Step 308: Upon a condition that there is no data to be transferred to the station or after the station transmits and receives all needed data, perform a sleep mode to power off the connectivity module 140, the timer 101, the retention memory 116, the central processing unit 110, and the peripheral devices 114.

In step 300, the GPIO device 115 generates a wake up signal in response to an external event. When receiving the wake up signal, the battery 130 supplies power to power on the connectivity module 140, the timer 101, the retention memory 116, the central processing unit 110, and the peripheral devices 114. In this moment, the central processing unit 110 performs cold booting to initialize the connectivity module 140, the timer 101, the retention memory 116, and the peripheral devices 114.

Figure 4:
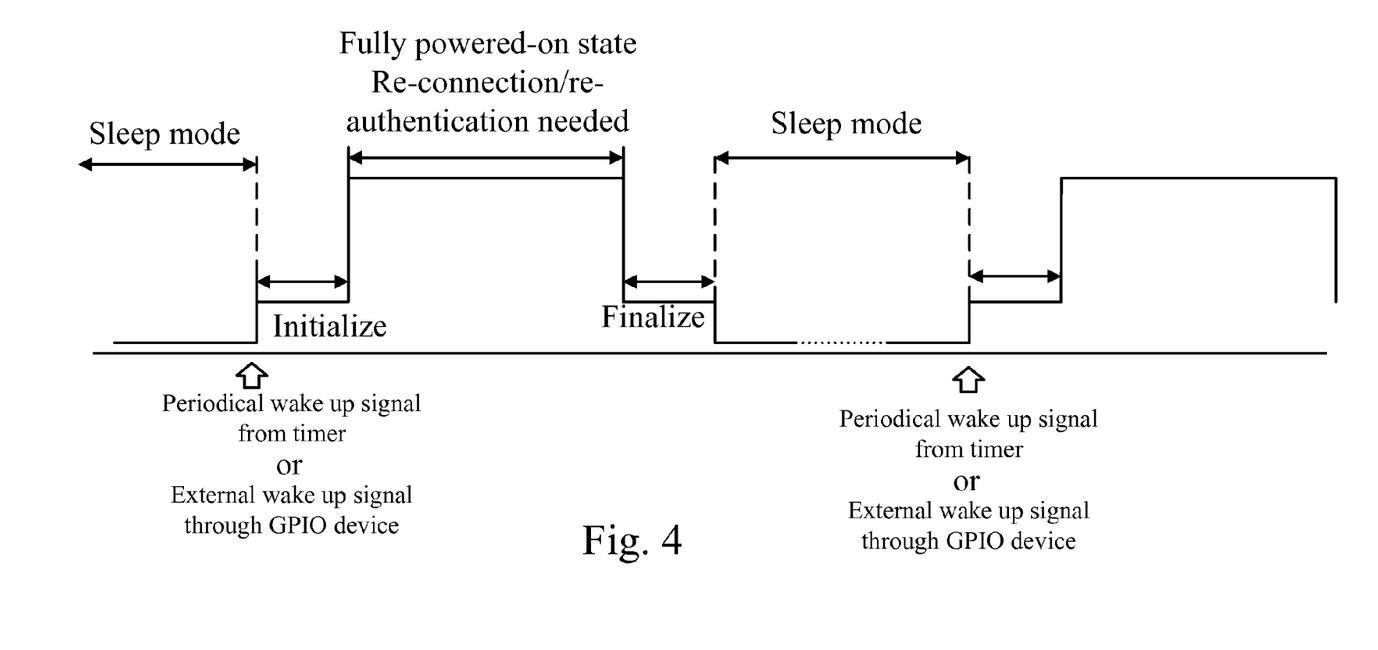
FIG. 4 illustrates a variety of power supply to the station of the present invention.
Figure 5:
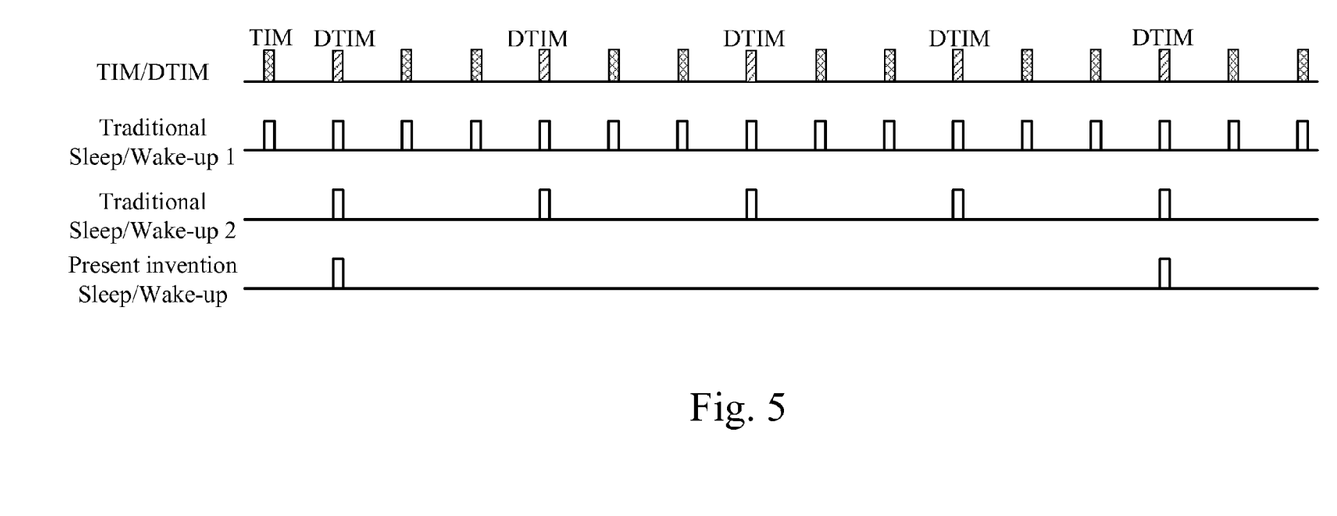
FIG. 5 illustrates a comparison of sleep/wake up modes between conventional technology and the present invention.

Referring to FIGS. 3-5, FIG. 4 illustrates a variety of power supply to the station of the present invention, and FIG. 5 illustrates a comparison of sleep/wake up modes between conventional technology and the present invention. As shown in FIG. 5, the access point 200 shall transmit a Traffic Indication Map (TIM) with every beacon, and for every Delivery Traffic Indication Message (DTIM) period, a TIM of type "DTIM" is transmitted within a beacon. The TIM in a given beacon indicates to the station 100 whether there is pending unicast traffic for that station 100 in the upcoming beacon interval. The DTIM is a bitmap that indicates whether broadcast and multicast traffic is being delivered in the upcoming beacon interval. The DTIM is sent at an interval that is selected by the access point 200. The DTIM interval is typically multiple times the beacon interval and is fixed for a Basic Service Set (BSS), which is a network of stations associated to the access point 200.

Upon the connectivity module 140, CPU 110, and the peripheral devices 114 are under a connection state or an authenticated state, (i.e., the station 100 reconnects the access point 200 or the station 100 re-authenticates the access point 200), broadcast frames or multicast frames buffered in the access point 200 are transferred to the station 100 along with DTIM. Then, the station 100 can detect whether there is data (i.e. buffered broadcast or multicast frames) is transferred along with DTIM. The authenticated state indicates that the station 100 connects to the access point 200 after an authentication process such as logging in or keying in a password.

In step 306, in the case that data (i.e. buffered frames) along with the DTIM is transmitted from the access point 200, the station 100 receives the data along with the beacon frame. In step 308, if there is no data along with DTIM to be transferred from the access point 200, it represents that no data is buffered in the access point 200. The station 100 performs a sleep mode to power off the connectivity module 140, the timer 101, the retention memory 116, the central processing unit 110, and the peripheral devices 114.

Please refer to FIG. 5. Before receiving a TIM or DTIM, the traditional station enables and supplies power from the battery to the elements to be ready for receiving buffered frames in the access points. By contrast, the present invention proposes that a wake up signal is sent from the GPIO device 115 in response to an external event. Upon receiving the wake up signal, the battery 130 supplies power to power on the connectivity module 140, the timer 101, the central processing unit 110, and the peripheral devices 114. Since the interval of the wake up signal sent from the GPIO device 115 in response to the external event is a few multiples of the DTIM intervals, the sleep period of the elements in the station 100 according to the present invention is longer than the conventional DTIM intervals. Therefore, the station using the present invention may save more power and thus make the battery life longer.

Figure 6:
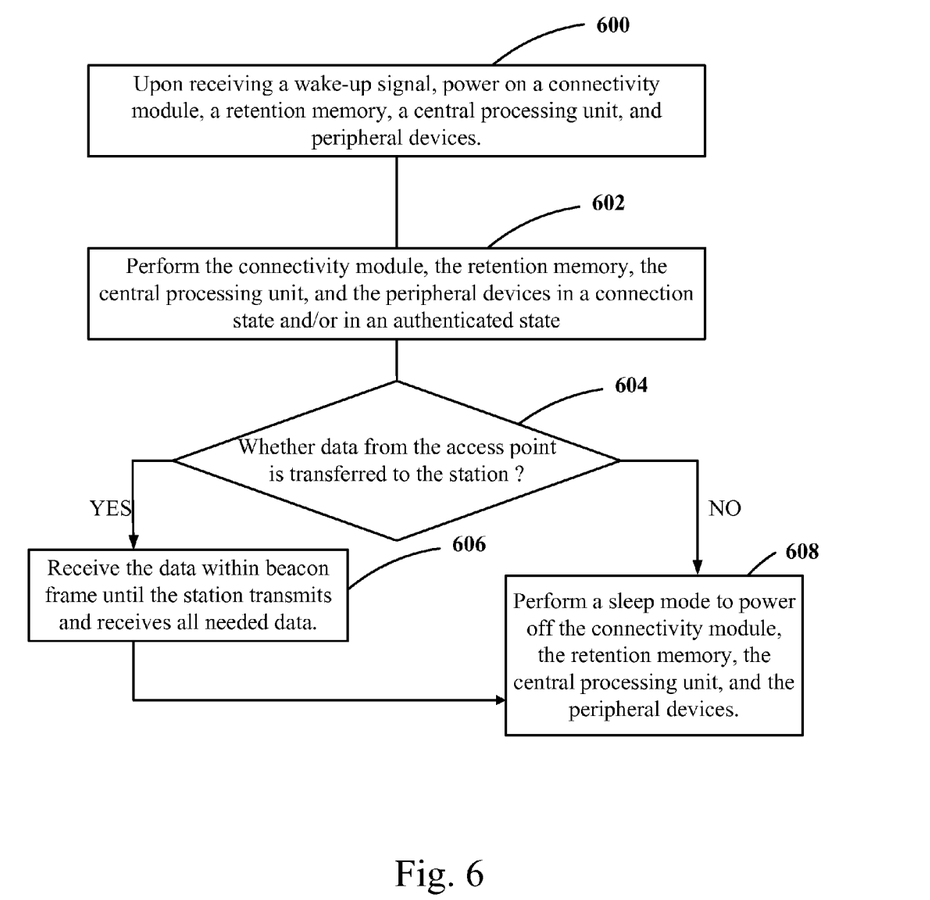
FIG. 6 is a flowchart of a method of saving power of a station in a wireless network according to a second embodiment of the present invention.

Please refer to FIG. 6 in conjunction to FIG. 2. FIG. 6 is a flowchart of a method of saving power of a station in a wireless network according to a second embodiment of the present invention. The method comprises:

Step 600: Upon receiving a wake-up signal, power on the connectivity module 140, the retention memory 116, the central processing unit 110, and the peripheral devices 114.

Step 602: Perform the connectivity module 140, the retention memory 116, the central processing unit 110, and the peripheral devices 114 in a connection state and/or in an authenticated state.

Step 604: Check whether data from the access point 200 is transferred to the station 100.

Step 606: Receive the data within beacon frame.

Step 608: Upon a condition that there is no data to be transferred to the station or after the station transmits and receives all needed data, perform a sleep mode to power off the connectivity module 140, the retention memory 116, the central processing unit 110, and the peripheral devices 114.

In step 600, the GPIO device 115 generates a wake up signal in response to an external event, or the timer 101 periodically generates a wake up signal. The wake-up signal is generated when the timer 101 expires by a predetermined time period such as 5 seconds. The interval of the periodical wake up signal from the timer 101 is a few multiples of DTIM intervals. For example, the interval of the periodical wake up signal from the timer 101 (5 seconds) is 10 times of DTIM intervals (500 mili-seconds). When receiving the wake up signal, the battery 130 supplies power to power on the connectivity module 140, the retention memory 116, the central processing unit 110, and the peripheral devices 114. In this moment, the central processing unit 110 performs cold booting to initialize the connectivity module 140, the retention memory 116, and the peripheral devices 114. Differing from the first embodiment, the timer 101 of the second embodiment enables and periodically generates the wake up signal during the sleep mode.

Upon the connectivity module 140, CPU 110, and the peripheral devices 114 are under a connection state or an authenticated state, (i.e., the station 100 reconnects the access point 200 or the station 100 re-authenticates the access point 200), broadcast frames or multicast frames buffered in the access point 200 are transferred to the station 100 along with DTIM. Then, the station 100 can detect whether there is data (i.e. buffered broadcast or multicast frames) is transferred along with DTIM. The authenticated state indicates that the station 100 connects to the access point 200 after an authentication process such as logging in or keying in a password.

In step 606, in the case that data (i.e. buffered frames) along with the DTIM is transmitted from the access point 200, the station 100 receives the data along with the beacon frame. In step 608, if there is no data along with DTIM to be transferred from the access point 200, it represents that no data is buffered in the access point 200. The station 100 performs a sleep mode to power off the connectivity module 140, the retention memory 116, the central processing unit 110, and the peripheral devices 114.

Please refer to FIG. 5. Before receiving a TIM or DTIM, the traditional station enables and supplies power from the battery to the elements to be ready for receiving buffered frames in the access points. By contrast, the present invention proposes that a wake up signal is sent from the GPIO device 115 in response to an external event or is periodically generated by the timer 101. Upon receiving the wake up signal, the battery 130 supplies power to power on the connectivity module 140, the central processing unit 110, and the peripheral devices 114. Since either the interval of the wake up signal sent from the GPIO device 115 in response to the external event or the interval of the wake up signal periodically generated by the timer 101 is a few multiples of the DTIM intervals, the sleep period of the elements in the station 100 according to the present invention is longer than the conventional DTIM intervals. Therefore, the station using the present invention may save more power and thus make the battery life longer.

Figure 7:
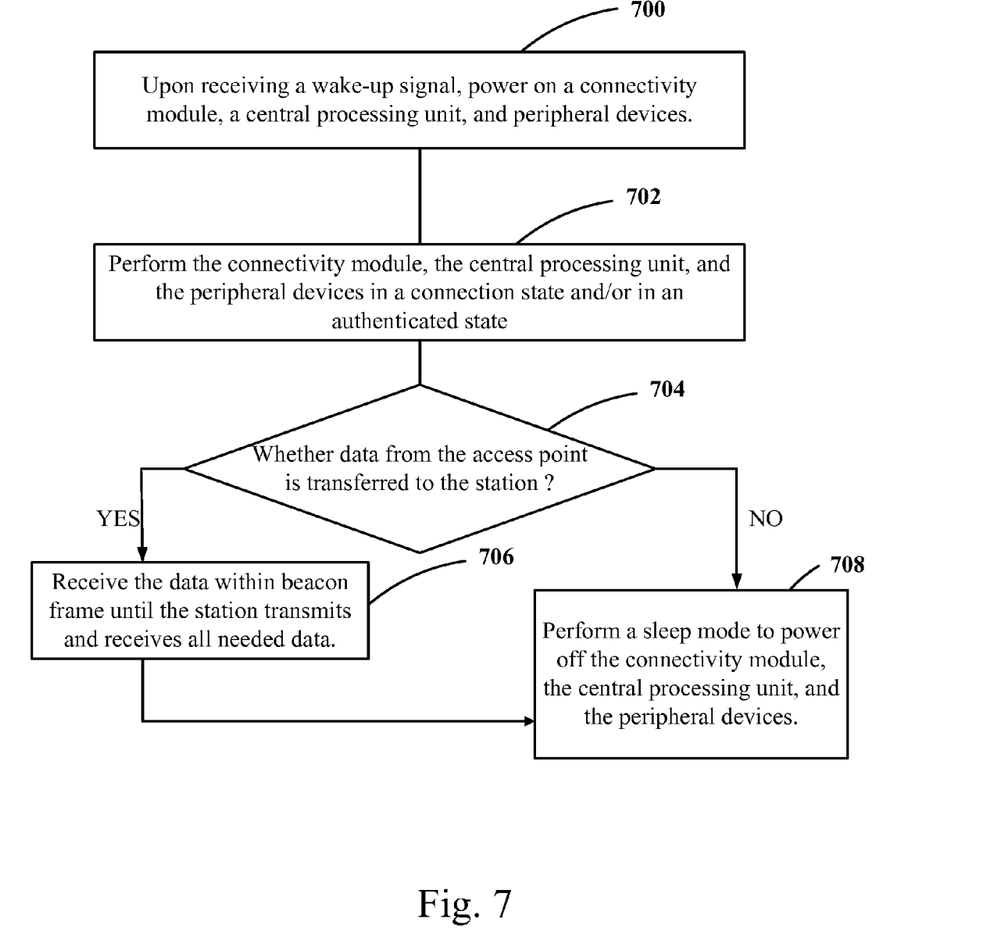
FIG. 7 is a flowchart of a method of saving power of a station in a wireless network according to a third embodiment of the present invention.

Please refer to FIG. 7 in conjunction to FIG. 2. FIG. 7 is a flowchart of a method of saving power of a station in a wireless network according to a third embodiment of the present invention. The method comprises:

Step 700: Upon receiving a wake-up signal, power on the connectivity module 140, the central processing unit 110, and the peripheral devices 114.

Step 702: Perform the connectivity module 140, the central processing unit 110, and the peripheral devices 114 in a connection state and/or in an authenticated state.

Step 704: Check whether data from the access point 200 is transferred to the station 100.

Step 706: Receive the data within beacon frame.

Step 708: Upon a condition that there is no data to be transferred to the station or after the station transmits and receives all needed data, perform a sleep mode to power off the connectivity module 140, the central processing unit 110, and the peripheral devices 114.

In step 700, the GPIO device 115 generates a wake up signal in response to an external event, or the timer 101 periodically generates a wake up signal. The wake-up signal is generated when the timer 101 expires by a predetermined time period such as 5 seconds. The interval of the periodical wake up signal from the timer 101 is a few multiples of DTIM intervals. For example, the interval of the periodical wake up signal from the timer 101 (5 seconds) is 10 times of DTIM intervals (500 mili-seconds). When receiving the wake up signal, the battery 130 supplies power to power on the connectivity module 140, the central processing unit 110, and the peripheral devices 114. In this moment, the central processing unit 110 performs cold booting to initialize the connectivity module 140, and the peripheral devices 114. In another case, the central processing unit 110 performs warm booting to read the relevant information from the retention memory 116 relating to associated states of the central processing unit 110 and the peripheral devices 114, and relating to authenticated states of the connectivity module 140 in a previous operation occurred before the last sleep mode. In this way, the station 100 rapidly recovers to the associated and authenticated states the same as before the last sleep by restoring the relevant information from the retention memory 116 without performing a new association process and a new authentication process to the access point 200 or another station. Differing from the first embodiment, during the sleep mode, the timer 101 of the third embodiment enables and periodically generates the wake up signal, or the retention memory 116 stores relevant information relating to associated states of the central processing unit 110 and the peripheral devices 114, and relating to authenticated states of the connectivity module 140 in a previous operation occurred before the last sleep mode.

Upon the connectivity module 140, CPU 110, and the peripheral devices 114 are under a connection state or an authenticated state, (i.e., the station 100 reconnects the access point 200 or the station 100 re-authenticates the access point 200), broadcast frames or multicast frames buffered in the access point 200 are transferred to the station 100 along with DTIM. Then, the station 100 can detect whether there is data (i.e. buffered broadcast or multicast frames) is transferred along with DTIM. The authenticated state indicates that the station 100 connects to the access point 200 after an authentication process such as logging in or keying in a password.

In step 706, in the case that data (i.e. buffered frames) along with the DTIM is transmitted from the access point 200, the station 100 receives the data along with the beacon frame. In step 708, if there is no data along with DTIM to be transferred from the access point 200, it represents that no data is buffered in the access point 200. The station 100 performs a sleep mode to power off the connectivity module 140, the central processing unit 110, and the peripheral devices 114.

Please refer to FIG. 5. Before receiving a TIM or DTIM, the traditional station enables and supplies power from the battery to the elements to be ready for receiving buffered frames in the access points. By contrast, the present invention proposes that a wake up signal is sent from the GPIO device 115 in response to an external event or is periodically generated by the timer 101. Upon receiving the wake up signal, the battery 130 supplies power to power on the connectivity module 140, the central processing unit 110, and the peripheral devices 114. Since either the interval of the wake up signal sent from the GPIO device 115 in response to the external event or the interval of the wake up signal periodically generated by the timer 101 is a few multiples of the DTIM intervals, the sleep period of the elements in the station 100 according to the present invention is longer than the conventional DTIM intervals. Therefore, the station using the present invention may save more power and thus make the battery life longer.

The method of saving power of the station in the wireless network described herein may be implemented by various means. For example, these techniques may be implemented in hardware, firmware, software, or a combination thereof. For a hardware implementation, the processing units used to perform the techniques at a station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units used to perform the techniques at an access point may be implemented within one or more ASICs, DSPs, processors, etc.

For a firmware and/or software implementation, the power saving techniques may be implemented with modules (e.g., procedures, functions, etc.) that perform the functions described herein. The firmware and/or software codes may be stored in a memory 112 for CPU 110 in FIG. 2 and executed by a processor (e.g., CPU 110). The memory may be implemented within the processor or external to the processor.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A method of saving power of a station in wireless network, the station comprising a connectivity module, a central processing unit (CPU), a timer, and peripheral devices, the method comprising:
   upon receiving a wake-up signal which is generated when the timer expires by a predetermined time period, powering on the connectivity module, the central processing unit, and the peripheral devices;
   performing the central processing unit, the peripheral devices, and e connectivity module in a connection state or in an authenticated state;
   upon a condition that there is no data to be transferred to the station or after the station transmits and receives all needed data, performing a sleep mode to power off the connectivity module, the central processing unit, and the peripheral devices; and
   upon a condition that there is data to be transferred by checking delivery traffic indication message (DTIM) from an access point, performing the connectivity module in the authenticated state,
   wherein the predetermined time period is longer than an interval between two delivery traffic indication messages from the access point.

2. The method of claim 1 wherein the station further comprises a general purpose input/output (GPIO) device, and the wake-up signal is sent from the GPIO device in response to an external event.

3. The method of claim 1 wherein the method further comprises:
   upon receiving the wake-up signal, powering on the timer;
   performing the timer in the connection state; and upon the condition that there is no data to be transferred to the station or after the station transmits and receives all needed data, performing the sleep mode to power off the timer.

4. The method of claim 1 wherein the station further comprises a retention memory for storing information relating to associated states of the central processing unit, and the peripheral devices, and relating to authenticated states of the connectivity module in a previous operation occurred before the last sleep mode, and the method further comprises:
   performing the connectivity module in the authenticated state complying with the previous operation.

5. The method of claim 1 wherein the connectivity module comprises a modulator/demodulator, a radio frequency (RF) transceiver, an analog-to-digital converter, a digital-to-analog converter, and a media access controller.

6. The method of claim 1 wherein the connectivity module of the station connects to another station by using WiFi ,Bluetooth ,Zigbee , and ZWAVE wireless technology protocol.

\* \* \* \* \*